T. C. SINCLAIR.
SIGHTING APPARATUS FOR USE WITH ANTIAIRCRAFT GUNS.
APPLICATION FILED OCT. 26, 1920.
1,404,662.
Patented Jan. 24, 1922.
5 SHEETS—SHEET 3.
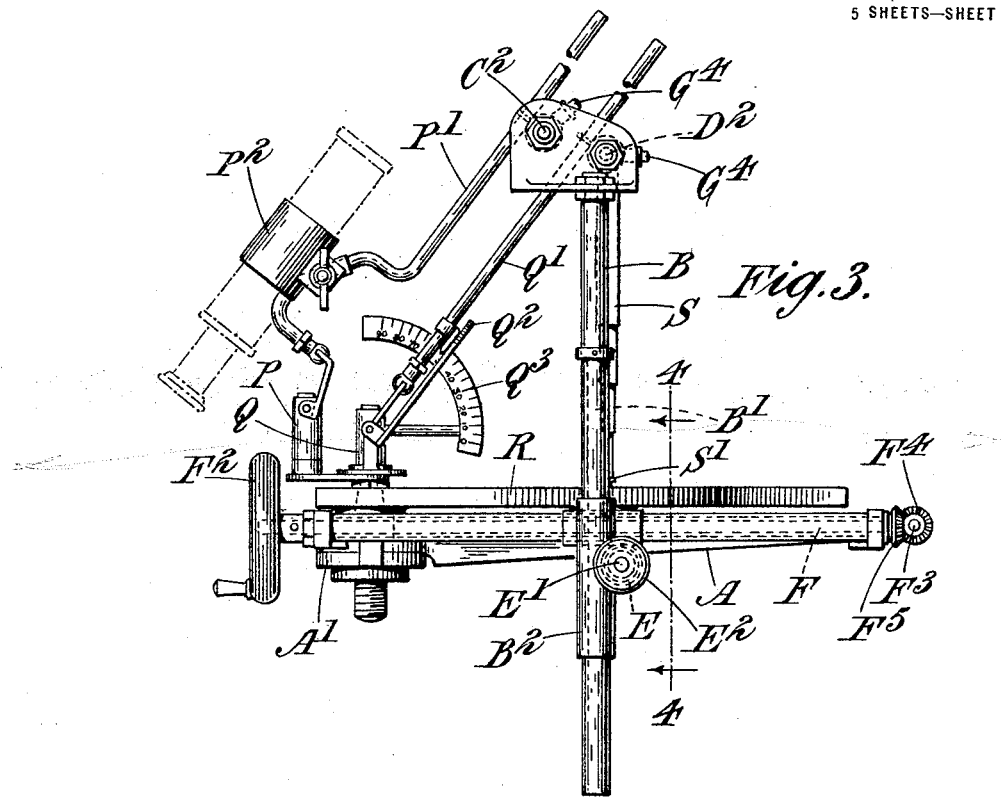
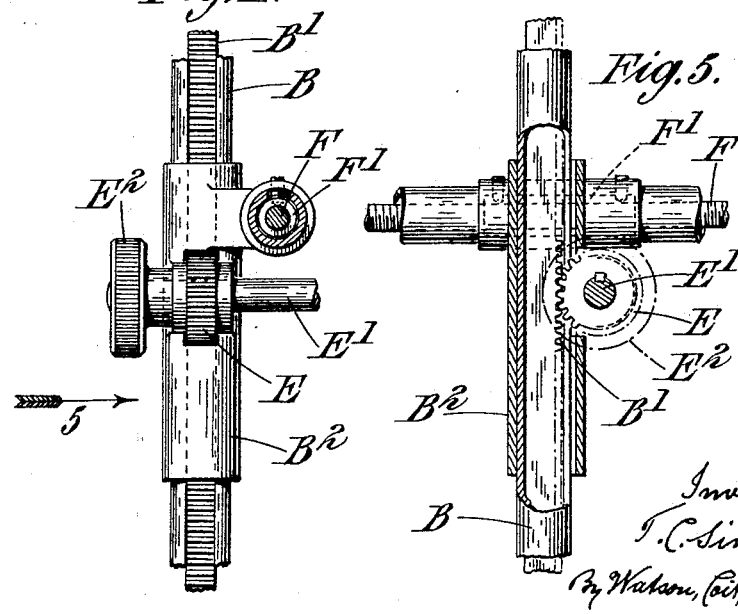

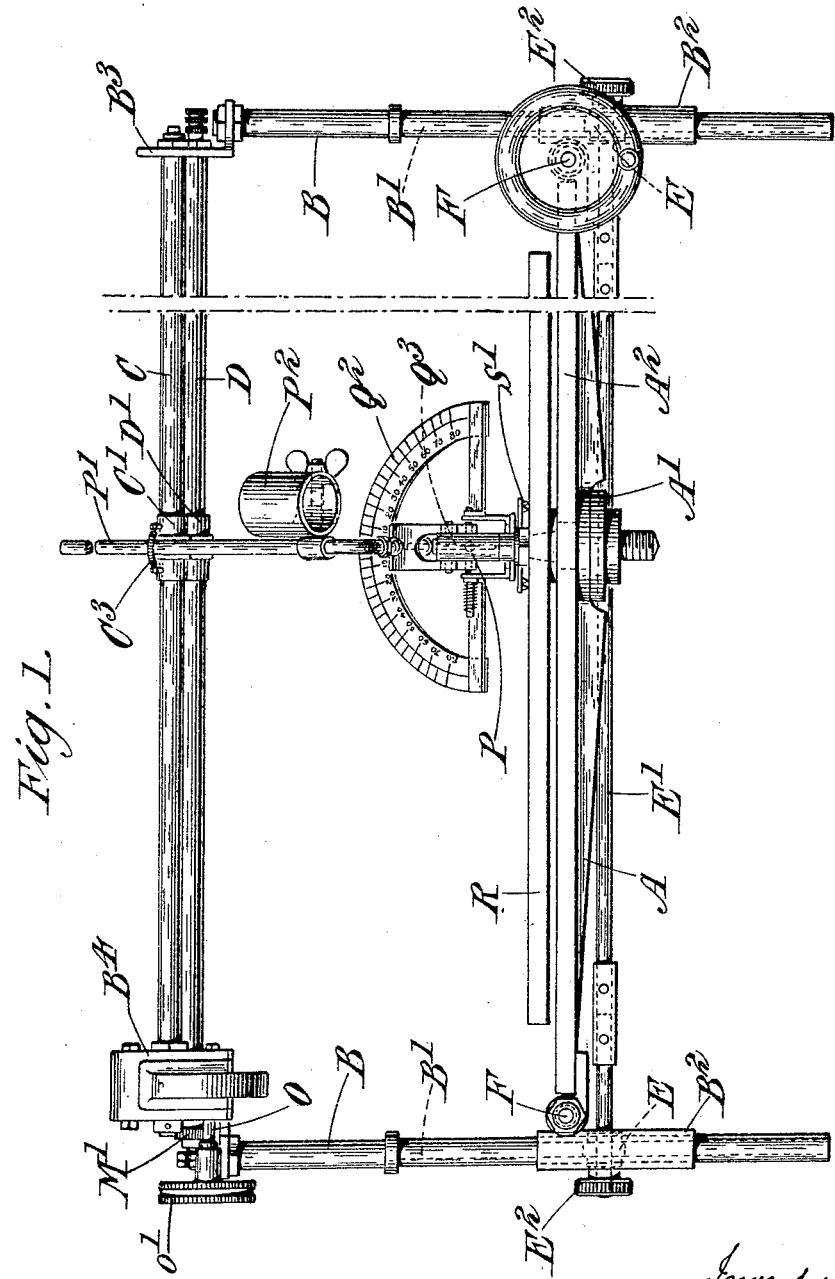

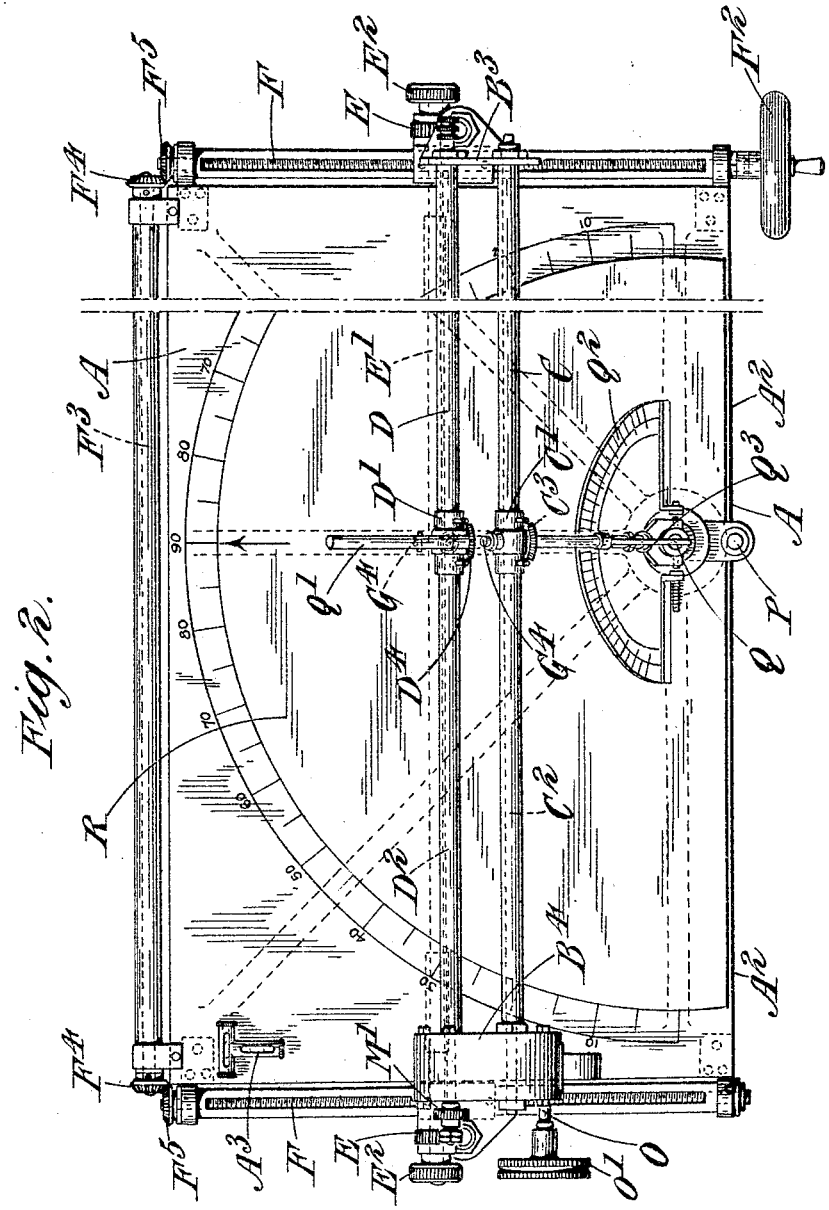

T. C. SINCLAIR.
SIGHTING APPARATUS FOR USE WITH ANTIAIRCRAFT GUNS.
APPLICATION FILED OCT. 26, 1920.
1,404,662.
Patented Jan. 24, 1922.
5 SHEETS—SHEET 4.
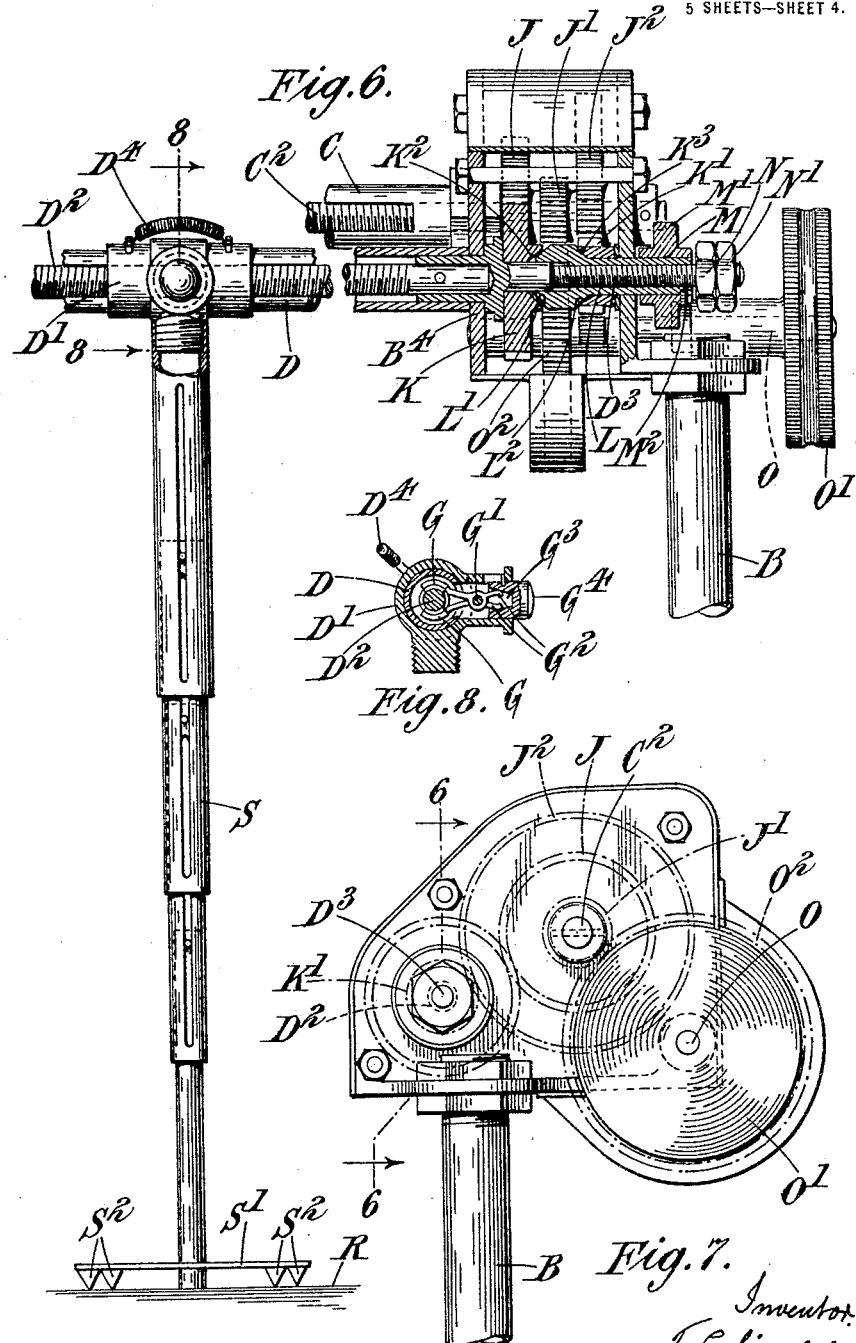

UNITED STATES PATENT OFFICE.

THOMAS CHARLES SINCLAIR, OF CADNAM, ENGLAND.

SIGHTING APPARATUS FOR USE WITH ANTIAIRCRAFT GUNS.

1,404,662. Specification of Letters Patent. Patented Jan. 24, 1922.

Application filed October 26, 1920. Serial No. 419,746.

*To all whom it may concern:*

Be it known that I, THOMAS CHARLES SINCLAIR, subject of the King of England, residing at Cadnam, Hampshire, in England, have invented certain new and useful Improvements in Sighting Apparatus for Use with Antiaircraft Guns, of which the following is a specification.

This invention relates to sighting apparatus for use with anti-aircraft guns and has for its object to provide a simple and portable apparatus which will give an actual representation of the present and future lines of sight while at the same time indicating the corresponding fuse setting.

According to this invention two sighting bars or like members which are upwardly inclined are movable at the same or at different speeds so as to follow a co-ordinate representation of the horizontal path of an aerial target whereby the lateral deflection is indicated and recorded both in azimuth and in the plane of sight. One of the sighting members can have imparted to it a velocity greater than that of the other and this member co-operates with a horizontally disposed height fuse indicator chart over which the two members are movable. The whole arrangement constitutes a three-dimensional representation of the true line of sight and of the future line of sight combined with means for indicating the corresponding fuse setting. Two horizontally disposed parallel guide members are mounted so that their height above a base member is adjustable and so that they can be swung in azimuth and thus represent the horizontal path of an aerial target. The two sighting bars are pivoted near each other at their lower ends to the base member and upwardly directed so that they respectively cut across the guide members along which the bars can be moved by suitable mechanism. The first sighting member represents the true line of sight while the second member which can be moved along its guide member simultaneously with or in relation with the first member represents the future line of sight. It must be remembered that, in common with all other anti-aircraft predictors, this instrument is operated on the assumption that the height of the target remains approximately constant.

The invention may be carried out in practice in various ways but the accompanying drawings illustrate by way of example a construction that may be adopted. In these drawings—

Figure 1 is an elevation of the complete instrument as viewed from the rear or operator's side.

Figure 2 is a plan of the instrument with the first sight bar removed for the sake of clearness.

Figure 3 is a side elevation.

Figure 4 is a section on the line 4—4 in Figure 3 and illustrates a detail on an enlarged scale.

Figure 5 is a sectional view looking in the direction of the arrow 5 in Figure 4.

Figure 6 is a longitudinal sectional elevation on an enlarged scale of the detail construction of the guide bars and the mechanism associated with them the section being taken on the line 6—6 in Figure 7 looking in the direction of the arrows.

Figure 7 is an end or side elevation of the parts shown in Figure 6.

Figure 8 is a section on the line 8—8 of Figure 6 looking in the direction of the arrows and illustrating the detail construction of one of the sliding holders and one method whereby this may be locked to or freed from the traversing screw within the guide bar on which the holder is mounted.

Like letters indicate like parts throughout the drawings.

Figure 9:
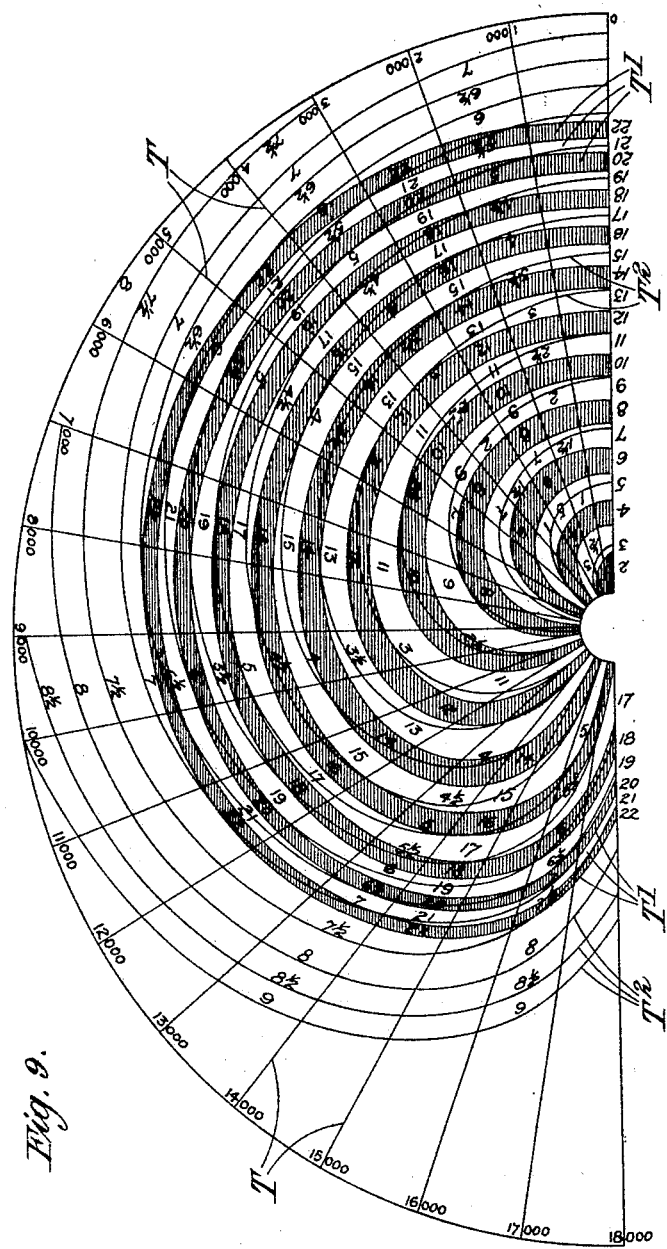
Figure 9 represents by way of example a height fuse indicator chart adapted to be used with the present apparatus.

A base plate A of suitable dimensions is pivotally mounted at A' on a tripod or other stand so that it can swing about its pivot in a horizontal plane. The base plate is rectangular and in the preferred construction one edge $A^2$ lies adjacent to the pivot A'. It is desirable to mount levels $A^3$ on the base plate so as to enable it to be set truly horizontally. At either end of the base plate are two similar vertical members B whose upper ends carry two parallel horizontal guide members C and D. The vertical members B are constructed and arranged so that the height of the guide members C and D above the base plate A can be varied while maintaining these guide members truly parallel to the surface of the base plate. Graduations constituting a height scale are provided on one or both of the vertical members B to enable the height of the guide members C and D to be set. For example each vertical member is provided with a rack B' with which engages a pinion E the two pinions being carried towards the opposite ends of a rod E' which extends beneath the base plate A and is provided at its ends with milled nuts $E^2$ or the like by means of which the rod with the two pinions can be rotated so that the vertical members are caused to slide upwardly or downwardly through sockets $B^2$. These two sockets $B^2$ for the vertical members are mounted so that they can be simultaneously moved along the two opposite side edges of the base plate A in order that the position of the parallel members C and D over the surface of the base plate can be varied. This movement of the parallel members over the base plate may be effected in various ways as for example by mounting along the sides or ends of the base plate A two traversing screws F each of which engages a member F' carried on the socket $B^2$ these traversing screws F being coupled so that they can be simultaneously rotated by a hand wheel $F^2$. Conveniently the coupling is effected by a rod $F^3$ carried in bearings at the side of the base plate A remote from the edge $A^2$ near the pivot A' bevel wheels $F^4$ on the ends of this rod gearing with bevel wheels $F^5$ on the adjacent ends of the traversing screws F. The hand wheel $F^2$ is mounted preferably at the inner or near end of the right hand traversing screw F. By means of these mechanisms the twin guide bars C and D can have their height and position over the base plate A varied simultaneously while these guide bars are constantly maintained parallel to the surface of the base plate and to the near and distant edges thereof. The guide members C and D constitute a representation of the aerial path of the target, the height adjustment being in accordance with the ascertained height of the target while the position of the guide members with relation to the pivot axis of the base plate A is determined in accordance with the presentation angle of the target. Since, as mentioned, the whole base plate A with the vertical supports B and guide members C and D can be swung in azimuth about the pivot A' on which the base plate is mounted these guide members can be moved into a position such that they will constitute an actual representation in miniature of the target's path. This path will then lie parallel to the actual path of the target so that a sight bar which lies across and can be moved along one of these guide members can be maintained on the target as long as the latter follows a straight course.

The construction of the guide members C and D may vary but each may comprise for example a tube on which is mounted a tubular or other holder C' D' adapted to be traversed along the guide tube by means of a screw $C^2$ $D^2$ disposed within this tube as shown in Figure 6. Each holder C' and D' is provided with a divided nut G or other device as shown in Figure 8 which can be caused to engage the screw $C^2$ or $D^2$ or be released therefrom so as to free the holder and enable it to be slid into any desired position along the guide tube C or D. The traversing screws $C^2$ and $D^2$ within the guide tubes C and D are carried at their ends in bearing plates $B^3$ $B^4$ mounted on the tops of the vertical supports B and these screws are geared together at one end with a change speed device which enables the screws to be rotated either at the same speed or one of them at a higher speed than the other. Conveniently the change speed device is a simple one arranged to enable the screw $D^2$ within the second guide member D to be rotated at four times the speed of the screw $C^2$ which is carried in the first guide member C. Thus the two holders C' and D' can be moved freely along the guide members into any desired position and then quickly coupled to the traversing screws when these holders can be simultaneously moved along the guides. When desired by adjustment of the gearing the holder D' on the second guide D can be caused to accelerate with respect to the holder C' on the first guide C. Rotation of the traversing screws $C^2$ and $D^2$ is effected by a hand wheel H mounted at one end.

The change speed mechanism employed for the rotation of the traversing screws $C^2$ and $D^2$ may be as illustrated for example in detail in Figures 6 and 7, but other constructions may be adopted if desired. As here shown there are fixed on the end of the traversing screw $C^2$ three gear wheels J, J' and $J^2$. On the corresponding end of the traversing screw $D^2$ are carried a gear wheel K and a pinion K'. The gear wheel K is loose and meshes with the wheel J on the screw $C^2$ while the pinion K' which is also loose meshes with the gear wheel $J^2$. A sleeve L which is internally screw-threaded is mounted on and engages the screw-threaded end part $D^3$ of the screwed rod $D^2$ so that by rotating the sleeve relatively to the screwed rod the sleeve can be moved on the rod in the axial direction. The sleeve L carries towards its inner end an enlargement on which are formed two oppositely arranged cones L' and $L^2$. The cone L' is adapted to engage a hollow cone $K^2$ formed in the boss of the gear wheel K while the cone $L^2$ is adapted to engage a hollow cone $K^3$ formed in the boss of the pinion K'. While the gear wheel K runs loosely on an unthreaded portion of the end of the screwed rod $D^2$ the pinion K' is carried on the sleeve L. The arrangement is such that by moving the sleeve L axially in one direction or the other either the gear wheel K or the pinion K' can be clutched to the sleeve and so to the end of the traversing screw $D^2$. The outer portion of the sleeve L together with the end part $D^3$ of the screw-threaded rod extend beyond and lie outside the casing which encloses the gearing. On this end portion of the sleeve L is mounted a collar M which has an enlargement M' which is milled and forms a nut which can be grasped by the fingers. This collar M is fixed to the sleeve L by a set screw $M^2$. On the extreme end of the screw-threaded part $D^3$ is a nut N and a lock nut N'. If the milled nut M' is turned, the nuts N and M' if necessary being grasped at the same time by the other hand, the sleeve L can be rotated on the part $D^3$ of the screwed rod $D^2$ and caused to move in one direction or the other so as to engage either of the cones L' or $L^2$ with the wheels K or K' and alternatively lock one or the other of these wheels to the end of the rod $D^2$. Thus the screwed rods $C^2$ and $D^2$ can be rotated either at the same or at different speeds according to the gear ratio. Other forms of gearing may be employed for the same purpose instead of the construction above described. On a short shaft O there is mounted at one end a wheel O' by means of which the shaft can be turned by the hand while towards the other end of the shaft is fixed a gear wheel $O^2$ which meshes with the gear wheel or pinion J' on the end of the traversing screw $C^2$. Thus by turning the wheel O' relatively rapid rotation of both traversing screws will be brought about and the screw $D^2$ will be rotated either at the same speed if the gear wheel K is locked to the screw $D^2$ or at a greater speed if the pinion K' is operative.

At or adjacent to the axis of the pivot A' about which the base plate A can be swung and on the upper side of this plate there are pivotally mounted at P and Q the lower ends of two upwardly inclined sighting bars P' and Q'. The first bar P' as shown in the drawings may have its pivot point slightly to the rear or on the near side of the base plate pivot axis while the pivotal mounting of the second sight bar Q' conveniently coincides with this pivot axis. Each pivot is arranged so that the sight bar carried thereby can be inclined at any desired angle and in any direction. The sight bar P' has mounted on it in some convenient manner and in a suitable position a sighting telescope $P^2$ or like device the axis of which is parallel to that of the sighting bar so that by means of this sighting device the bar can be positioned so as to truly represent the actual line of sight on the target. The sight bar Q' represents the future line of sight and adjacent to its lower end there are arranged two graduated arcs $Q^2$ and $Q^3$ with which a pointer or pointers on the bar co-operate, these quadrants serving to indicate the angle of elevation of the bar in a vertical plane and its angle of inclination in another plane which cuts this vertical plane at a variable angle. A light spring causes the quadrant $Q^2$ to always bear against the under-side of the sight bar Q' so that the quadrant is always maintained in the same plane as the sight bar.

The two sight bars P' and Q' respectively lie against and are connected to the holders C' and D' on the twin guide members C and D. The connection between each sight bar and its holder is such as to allow free movement of the sight bar both longitudinally and at an angle about the holder as the latter is moved along its guide member. For example the connections may be coiled springs $C^3$ $D^4$ which lie across the bars as shown in the drawings with their ends attached to the holders. Thus as the holders C' and D' are caused to travel along the path of the target as represented by the parallel guide members C and D so will the sighting bars P' and Q' be constrained to move along this path at the determined speeds. Thus if the whole base plate A is swung in azimuth so as to bring the guide members C and D into a position parallel to the course of the aerial target and after these guide members have been adjusted with regard to their height to correspond to the ascertained height of the target the guide bars can be positioned over the base plate so as to enable the first sight bar P' to be laid by means of the sighting device $P^2$ on the target. This bar P' is then kept on the target by rotation of the screw $C^2$ which causes the sight bar holder to travel along the guide C. At the outset the holder can be released and quickly moved along the guide bar until the required position is found when it can be coupled to the screw. The second sight bar Q' can be similarly laid on the target by adjusting its holder D' to the same position as is occupied by the holder C' of the sight bar P'. This similar positioning of the holders is facilitated by graduations along the guide members C and D. When the target has thus been found and the two sight bars are laid thereon they are simultaneously moved at the same speed and then by changing the gearing the holder D' can be driven at a greater speed so that after a predetermined time deduced from the time of flight of the shell the sight bar Q' will assume a position which represents the future line of sight. At that moment the readings are taken from the instrument and the required data thus obtained.

One construction that may be adopted in either of the holders C' or D' for the purpose of coupling them to or releasing them from the traversing screws $C^2$ or $D^2$ is shown for example in Figure 8. The two portions G of a divided nut adapted to engage the traversing screws are respectively carried on small two-armed levers pivoted about their centre at $G'$. The free ends $G^2$ of these levers lie in a conical hole $G^3$ formed within a push button $G^4$. The two parts G of the nut are caused to approach each other and engage the screw $D^2$ by means of a suitably disposed spring but if pressure is applied to the button $G^4$ the parts of the nut will be lifted clear of the screw and the holder $D'$ can then be moved freely along the tubular guide member D. If desired in place of a push button a rotatable stud or cap may be provided and constructed to actuate by engaging screw-threaded parts or in some other way members which carry or act on the parts of the divided nut, the arrangement being such that when the stud or cap is turned in one direction the holder will be freed and maintained in that state but if the cap is turned in the other direction the holder will be locked to the screw. Other constructions may be employed for the same purpose.

On the upper side of the base plate A there is pivotally mounted a quadrantal or semi-circular plate R which is pivoted about the axis of the base plate pivot $A'$. This quadrantal plate can thus be swung in azimuth about this axis. On the base plate A and just clear of the curved edge of the quadrant plate R is marked an arc with graduations in degrees which extend from zero points on a line which is conveniently parallel to the edge $A^2$ of the base plate and cuts through the pivot axis thereof, to a 90° mark positioned in the centre close to the more distant edge of the base plate. The angle through which the quadrant plate is swung with relation to the base plate can thus be determined by reading off the angle on the base plate.

The plate R is adapted to carry a height fuse indicator chart such as is shown for example in Figure 9. This chart comprises curves of equal fuse setting and curves of equal times of flight for varying trajectories of the same shell plotted in polar coordinates, the horizontal range being the radial coordinate and the height the angular coordinate, the scale of the range measurements being the same as that of the height graduations on the vertical members B. The height lines T are thus arranged radially from the centre about which the plate R is pivoted, these radial lines being spaced equi-angularly. Curves or curved zones $T'$, which are preferably marked alternately in some colour other than that of the ground of the chart, are plotted as curves of equal fuse settings, and other curves $T^2$ are plotted as curves of equal times of flight. The fuse curves of the ordinary height fuse indicator chart correspond to the centre lines of the zones $T'$. For convenience of reading each alternate zone is coloured or shaded so as to be distinguishable from the plain ground zones between them. The curves $T^2$ of equal times of flight are similarly plotted at two second intervals, but the times indicated are one quarter of the actual times, so that the time curve marked 2 indicates a time of flight of eight seconds. This arrangement is made to compensate for the 1:4 gearing used. This chart may be stated to be merely a convenient adaptation of the existing height fuse indicator chart to meet the requirements of the present instrument. The particular chart shown in the drawings is given for the purposes of illustration and is merely a typical example of the most convenient form of chart.

From the second sight bar holder $D'$ there depends vertically a pointer S having a suitably shaped end which lies just over the height fuse indicator chart so that by swinging the plate R on which the chart is mounted it can be set initially according to determined data and subsequently as the target is followed the future line of sight predicted and indicated so will the pointer indicate the corresponding fuse setting.

The pointer bar S is conveniently formed telescopic so as to enable the position of its lower end with relation to the surface of the height fuse indicator chart to be adjusted in accordance with the height adjustment of the guide bars C and D. The end of the pointer S preferably carries a short horizontally arranged bar $S'$ which lies parallel to the guide members C and D and to the surface of the chart and has on its under side downwardly directed projections $S^2$ adapted to indicate zones or curves marked on the height fuse indicator chart at either side of the centre of the pointer bar. In some cases several interchangeable bars $S'$ may be provided with the projections $S^2$ thereon arranged at different distances apart so as to give various readings on the indicator chart in conformity with the speed at which the target is moving. Alternatively, the bar $S'$ may be formed as a rotatable member carried on a horizontal axis with sets of differently arranged projections $S^2$ disposed around it. These different sets of projections can then be brought into position by turning the bar or member which carries them.

The gearing between the traversing screws $C^2$ and $D^2$ in the guide members C and D is conveniently arranged so that the relative speeds of rotation of these screws will be as 1 to 4 if the gearing is adjusted otherwise than to rotate the screws at the same speed. This ratio is purely arbitrary, but it has been chosen so that the time, during which the instrument is operated, shall be long enough in general to ensure efficient working, yet shall not delay firing too long. The time of flight curves on the height fuse indicator chart are conveniently marked, as has been already stated, to read one-fourth of the actual times of flight. The reason for this and for the gear ratio chosen will be apparent from the numerical example given after the next paragraph.

The manner in which the aparatus is used is as follows. Assuming that an aerial target, as for instance an aeroplane is observed, the height of the target is ascertained by suitable known means. The height of the guide members C and D is then adjusted in accordance with the ascertained height of the target by means of the graduations on the vertical members B. Next the presentation angle, or the angle between a line parallel to the observed path of the target and the base line, is estimated, and the base plate A carrying the whole instrument is then swung round on the stand through an angle equal to the estimated presentation angle. The guide members C and D are then parallel to the path of the target within the errors of the estimation. These guide members are then moved horizontally over the base plate, and at the same time the sliding holders C' and D' are released from the traversing screws $C^2$ and $D^2$ and are moved together along the guide members carrying with them the two sight bars P' and Q', until the sight bar P' is laid on the target by means of the sighting telescope carried thereby. The holders C' and D', which are then in identical positions on their respective guide members, are then coupled to the traversing screws $C^2$ and $D^2$ and these screws are rotated by the observer, the gearing being so set that the screws turn at the same speed. In this way the observer keeps the sight bar P' laid on the target, simultaneously correcting any error there may have been in the estimation of the presentation angle by small movements of the base plate A and the guide members C and D. While the observer is thus operating the instrument another person swings the quadrantal plate R as may be necessary in order to keep the downwardly directed pointer S over the radial height line on the chart which corresponds to the ascertained height of the target. When the instrument has been thus adjusted, the gearing is changed so as to drive the traversing screw $D^2$ at a greater speed, and from that moment during a period equal to one quarter of the time of flight of a projectile to the observed position of the target, the observer continues to keep the sight bar P' laid on the target by rotating the traversing screw $C^2$, while at the same time the sight bar Q' will be moving with four times the velocity of the sight bar P'.

At the end of this time interval the gearing is again adjusted so as to cause the traversing screw $D^2$ to be rotated at the same speed as the screw $C^2$. The sight bar Q' now represents the future line of sight of the target and continues to do so so long as the sight bar P' is kept laid on the target. Throughout the operation of the instrument the quadrantal plate R is independently moved to keep the pointer S over the correct height line on the chart, and when the sight bar Q' represents the future line of sight, the correct fuse setting can be read off from the position of the pointer on the chart. The lateral deflection will be indicated and can be read off both in azimuth on the base plate, according to the angle on the graduated arc indicated by the height line on the chart, and in the plane of sight on the graduated quadrant $Q^2$, over which the sight bar Q' moves. The other quadrant $Q^3$ will give a reading of the future angle of sight.

The method of operation of the instrument will be made more clear by a numerical illustration. If an aeroplane is observed approaching at a height of 10,000 feet and at a presentation angle of 70°, the guide members are adjusted to the corresponding height and the base plate is rotated through 70° so that the guide members lie parallel to the path of the target. The guide members and sight bars are then moved until the sight bar P' is laid on the target and the quadrantal plate R is swung round so that the 10,000 height line lies under the pointer, say at the point where this line is cut by the time curve marked 6, i. e. the 24 second time curve. The gearing is then changed and the sight bars moved at different speeds for a period of six seconds, when the gearing is changed back again so that they move at the same speed. The future line of sight predicted by the instrument clearly indicates a position of the target, at which the time of flight is (4—1)×6 seconds i. e. eighteen seconds. It will be found on measuring up the chart on the assumption of an aeroplane speed roughly approximating to a hundred miles per hour, that the future position will have a time of flight very close to eighteen seconds. The error is in general much less than the normal error of the gun and may therefore be neglected. A similar degree of accuracy is obtained for other values, and it is thus clear that the use of a 1:4 gearing in operation for a time equal to one fourth of the observed time of flight gives a sufficient degree of accuracy in the predicted future line of sight.

What I claim as my invention and desire to secure by Letters Patent is:—

1. In a sighting apparatus for use with anti-aircraft guns the combination of two sighting bar members, means for supporting these members so that each has a variable inclination, means for moving the said members at the same or at different speeds along a co-ordinate representation of the horizontal path of an aerial target whereby vertical and lateral deflections are indicated, and means for indicating the lateral deflection both in azimuth and in the plane of sight as set forth.

2. In a sighting apparatus for use with anti-aircraft guns the combination of two sighting bar members, means for supporting these members so that each has a variable inclination, means for moving the said members at the same or at different speeds along a co-ordinate representation of the horizontal path of an aerial target whereby vertical and lateral deflections are indicated, means for indicating the lateral deflection both in azimuth and in the plane of sight, and means for indicating a corresponding fuse setting as set forth.

3. In a sighting apparatus for use with anti-aircraft guns the combination of a base, two sighting bar members each pivotally supported at one end on the base the points of support being adjacent, two horizontal and parallel members adjustably mounted above the base and each constituting a support for one of the sighting bar members at a point intermediate in its length, means for simultaneously moving the sighting bar members along the horizontal members at the same or at different speeds, a horizontal height fuse indicator chart carried on the base, and means actuated by one of the sighting bar members for indicating a fuse setting on the chart as set forth.

4. In a sighting apparatus for use with anti-aircraft guns the combination of a base, a sighting bar member representing the true line of sight, a second sighting bar member representing the future line of sight, both members being pivotally supported at one end on the base the points of support being adjacent, two horizontal and parallel members adjustably mounted above the base and each constituting a support for one of the sighting bar members at a point intermediate in its length, means for moving the first sighting bar member along its horizontal supporting member at a substantially constant speed, means for simultaneously moving the second sighting bar member along its horizontal supporting member at a speed which is either the same as or different from that imparted to the first sighting bar member, a horizontal height fuse indicator chart carried on the base, and means actuated by one of the sighting bar members for indicating a fuse setting on the chart as set forth.

5. In a sighting apparatus for use with anti-aircraft guns the combination of a support, a horizontal base pivotally carried on the support so that the base can be swung in azimuth, two sighting bar members each pivotally supported at one end on the base at adjacent points which are substantially coincident with the pivot centre about which the base can swing, two horizontal and parallel members adjustably mounted above the base each constituting a support for one of the sighting bar members at a point intermediate in its length, means for simultaneously moving the sighting bar members along the horizontal members at the same or at different speeds, a horizontal height fuse indicator chart carried on the base, and means actuated by one of the sighting bar members for indicating a fuse setting on the chart as set forth.

6. In a sighting apparatus for use with anti-aircraft guns the combination of a support, a horizontal base pivotally carried on the support so that the base can be swung in azimuth, two sighting bar members each pivotally supported at one end on the base at adjacent points which are substantially coincident with the pivot centre about which the base can swing, two horizontal and parallel members adjustably mounted above the base each constituting a support for one of the sighting bar members at a point intermediate in its length, means for simultaneously moving the sighting bar members along the horizontal members at the same or at different speeds, a plate mounted on the base so that it can swing about a centre coincident with the pivot centre of the base, a horizontal height fuse indicator chart carried on this plate, and means actuated by one of the sighting bar members for indicating a fuse setting on the chart as set forth.

7. In a sighting apparatus for use with anti-aircraft guns the combination of a base, two sighting bar members each pivotally supported at one end on the base the points of support being adjacent, two horizontal and parallel members adjustably mounted above the base, carrier members which can slide respectively along the horizontal members each carrier being adapted to engage and support one of the sighting bar members at a point intermediate in its length, means for simultaneously moving the carrier members along the horizontal members at the same or at different speeds, a horizontal height fuse indicator chart carried on the base, and means actuated by one of the sighting bar members for indicating a fuse setting on the chart as set forth.

8. In a sighting apparatus for use with anti-aircraft guns the combination of a base, two sighting bar members each pivotally supported at one end at adjacent points on the base, two horizontal and parallel members adjustably mounted above the base, carrier members which can slide along the horizontal members, each carrier being adapted to engage and support one of the sighting bar members at a point intermediate in its length, adjustable gearing operative to move the carrier members simultaneously along the horizontal members at the same or at different speeds, a horizontal height fuse indicator chart carried on the base, and means actuated by one of the sighting bar members for indicating a fuse setting on the chart as set forth.

9. In a sighting apparatus for use with anti-aircraft guns the combination of two sighting bar members, means for supporting these members so that each has a variable inclination, means for moving one of the said members at a predetermined speed, means for simultaneously moving the second of said members at the same speed or for imparting thereto an acceleration in relation to the first member, a co-ordinate representation of the horizontal path of an aeriel target along which the sighting bar members are both moved whereby vertical and lateral deflections are indicated, means for indicating the lateral deflection both in azimuth and in the plane of sight, and means for indicating a corresponding fuse setting on the chart as set forth.

10. In a sighting apparatus for use with anti-aircraft guns the combination of a base, two sighting bar members each pivotally supported at one end on the base the points of support being adjacent, two horizontal and parallel members adjustably mounted above the base and each constituting a support for one of the sighting bar members at a point intermediate in its length, means for moving one of the sighting bar members along its horizontal member at a predetermined speed, means for simultaneously moving the second sighting bar member along its horizontal member at the same speed or for imparting thereto an acceleration in relation to the first member, a horizontal height fuse indicator chart carried on the base, and means actuated by one of the sighting bar members for indicating a fuse setting on the chart as set forth.

11. In a sighting apparatus for use with anti-aircraft guns the combination of a base, a sighting bar member representing the true line of sight, a second sighting bar member representing the future line of sight, both members being pivotally supported at one end on the base the points of support being adjacent, two horizontal and parallel members adjustably mounted above the base and each constituting a support for one of the sighting bar members at a point intermediate in its length, means for moving the first sighting bar member along its horizontal sighting bar member at a predetermined speed, means for simultaneously moving the second sighting bar member along its horizontal supporting member at the same speed or for imparting thereto an acceleration in relation to the first sighting bar member, a horizontal height fuse indicator chart carried on the base, and means actuated by one of the sighting bar members for indicating a fuse setting on the chart as set forth.

12. In a sighting apparatus for use with anti-aircraft guns the combination of a support, a horizontal base pivotally carried on the support so that the base can be swung in azimuth, two sighting bar members each pivotally supported at one end on the base at adjacent points which are substantially coincident with the pivot centre about which the base can swing, two horizontal and parallel members adjustably mounted above the base, carrier members which can slide respectively along the horizontal members each carrier being adapted to engage and support one of the sighting bar members at a point intermediate in its length, means for simultaneously moving the carrier members along the horizontal members at the same or at different speeds, a plate mounted on the base so that it can swing about a centre coincident with the pivot centre of the base, a horizontal height fuse indicator chart carried on this plate, and means actuated by one of the sighting bar members for indicating a fuse setting on the chart as set forth.

13. In a sighting apparatus for use with anti-aircraft guns the combination of a base, two sighting bar members each pivotally supported at one end on the base the points of support being adjacent, two horizontal and parallel tubular members adjustably mounted above the base each tube having a longitudinal slot in it, a screw-threaded rod rotatably mounted in each tubular member, means for rotating the two screw-threaded rods simultaneously at the same or at different speeds, carrier members mounted so that they can slide respectively along the tubular members each carrier being adapted to engage and support one of the sighting bar members at a point intermediate in its length, means whereby each carrier can be caused to engage or to be disconnected from the screw-threaded rod within the tubular member on which the carrier slides so that the carriers can be moved separately and freely along their respective horizontal members and can also be moved in accordance with the rotation imparted to the screw-threaded rods, a horizontal height fuse indicator chart carried on the base, and means actuated by one of the sighting bar members for indicating a fuse setting on the chart as set forth.

14. In a sighting apparatus for use with anti-aircraft guns the combination of a support, a horizontal base pivotally carried on the support so that the base can be swung in azimuth, a sighting bar member representing the true line of sight, a second sighting bar member representing the future line of sight both members being pivotally supported at one end of the base at adjacent points which are substantially coincident with the pivot centre about which the base can swing, two horizontal and parallel members adjustably mounted above the base and each constituting a support for one of the sighting bar members at a point intermediate in its length, means for moving one of the sighting bar members along its horizontal member at a substantially constant speed, means for simultaneously moving the second sighting bar member along its horizontal member at a speed which is either the same as or different from that imparted to the first sighting bar member, a plate mounted on the base so that it can swing about a centre coincident with the pivot centre of the base, a horizontal height fuse indicator chart carried on this plate, and means actuated by one of the sighting bar members for indicating a fuse setting on the chart as set forth.

15. In a sighting apparatus for use with anti-aircraft guns the combination of a base, a sighting bar member representing the true line of sight, a second sighting bar member representing the future line of sight, both members being pivotally supported at one end of the base the points of support being adjacent, two horizontal and parallel members adjustably mounted above the base, carrier members which can slide respectively along the horizontal members each carrier being adapted to engage and support one of the sighting bar members at a point intermediate in its length, means for moving the carrier member of the first sighting bar member along its horizontal support at a substantially constant speed, means for simultaneously moving the carrier of the second sighting bar member along its horizontal support at a speed which is either the same as or different from that imparted to the first sighting bar member, a horizontal height fuse indicator chart carried on the base, and means actuated by one of the sighting bar members for indicating a fuse setting on the chart as set forth.

16. In a sighting apparatus for use with anti-aircraft guns the combination of a base, a sighting bar member representing the true line of sight, a second sighting bar member representing the future line of sight, both members being pivotally supported at one end on the base the points of support being adjacent, two horizontal and parallel members adjustably mounted above the base and each constituting a support for one of the sighting bar members at a point intermediate in its length, adjustable gearing operative to move the first sighting bar member along its horizontal supporting member at a substantially constant speed and simultaneously move the second sighting bar member along its horizontal supporting member at a speed which is either the same as or different from that imparted to the first sighting bar member, a horizontal height fuse indicator chart carried on the base, and means actuated by one of the sighting bar members for indicating a fuse setting on the chart as set forth.

17. In a sighting apparatus for use with anti-aircraft guns the combination of a support, a horizontal base pivotally carried on the support so that the base can be swung in azimuth, two sighting bar members each pivotally supported at one end on the base at adjacent points which are substantially coincident with the pivot centre about which the base can swing, two horizontal and parallel tubular members adjustably mounted above the base each tube having a longitudinal slot in it, a screw-threaded rod rotatably mounted in each tubular member, means for rotating the two screw-threaded rods simultaneously at the same or at different speeds, carrier members mounted so that they can slide respectively along the tubular members each carrier being adapted to engage and support one of the sighting bar members at a point intermediate in its length, means whereby each carrier can be caused to engage or to be disconnected from the screw-threaded rod within the tubular member on which the carrier slides so that the carriers can be moved separately and freely along their respective horizontal members and can also be moved in accordance with the rotation imparted to the screw-threaded rods, a plate mounted on the base so that it can swing about a centre coincident with the pivot centre of the base, a horizontal height fuse indicator chart carried on the plate, and means actuated by one of the sighting bar members for indicating a fuse setting on the chart as set forth.

18. In a sighting apparatus for use with anti-aircraft guns the combination of a base, two sighting bar members each pivotally supported at one end on the base the points of support being adjacent, two horizontal and parallel tubular members adjustably mounted above the base each tube having a longitudinal slot in it, a screw-threaded rod rotatably mounted in each member, adjustable gearing operative to rotate the two screw-threaded rods simultaneously at the same or at different speeds, carrier members mounted so that they can slide respectively along the tubular members each carrier being adapted to engage and support one of the sighting bar members at a point intermediate in its length, means whereby each carrier can be caused to engage or to be disconnected from the screw-threaded rod within the tubular member on which the carrier slides so that the carriers can be moved separately and freely along their respective horizontal members and can also be moved in accordance with the rotation imparted to the screw-threaded rods, a horizontal height fuse indicator chart carried on the base, and means actuated by one of the sighting bar members for indicating a fuse setting on the chart as set forth.

19. In a sighting apparatus for use with anti-aircraft guns the combination of a support, a rectangular horizontal base pivotally carried on the support so that the base can be swung in azimuth, two sighting bar members each pivotally supported on the base at adjacent points which are substantially coincident with the pivot centre about which the base can swing, two vertical members disposed at opposite ends of the base and carrying at their upper ends two horizontal and parallel supporting members which extend between the vertical members, means for simultaneously moving the vertical members along the ends of the base, means for varying the height of the horizontal members above the base by simultaneously adjusting the height of the vertical members, carrier members which can slide respectively along the horizontal members each carrier being connected to and supporting one of the sighting bar members at a point intermediate in its length, means for simultaneously moving the carrier members along the horizontal members at the same or at different speeds, a plate mounted on the base so that it can swing about a centre coincident with the pivot centre of the base, a height fuse indicator chart carried on this plate, and means actuated by one of the sighting bar members for indicating a fuse setting on the chart as set forth.

20. In a sighting apparatus for use with anti-aircraft guns the combination of a base, two sighting bar members each pivotally supported at one end on the base the points of support being adjacent, two horizontal and parallel members adjustably mounted above the base and each constituting a support for one of the sighting bar members at a point intermediate in its length, means for simultaneously moving the sighting bar members along the horizontal members at the same or at different speeds, two graduated quadrants cooperating with one of the sighting bar members the quadrants being respectively disposed so as to give readings with the sighting bar member in a vertical plane and in a plane coincident with the horizontal member which supports the sighting bar, a horizontal height fuse indicator chart carried on the base, and means actuated by one of the sighting bar members for indicating a fuse setting on the chart as set forth.

21. In a sighting apparatus for use with anti-aircraft guns the combination of a base, two sighting bar members each pivotally supported at one end on the base the points of support being adjacent, two horizontal and parallel members adjustably mounted above the base and each constituting a support for one of the sighting bar members at a point intermediate in its length, means for simultaneously moving the sighting bar members along the horizontal members at the same or at different speeds, a sighting device mounted on the first bar member, two graduated quadrants co-operating with the second bar member the quadrants being respectively disposed so as to give readings with the sighting bar member in a vertical plane and in a plane coincident with the horizontal member which supports the second sighting bar, a horizontal height fuse indicator chart carried on the base, and means actuated by the second sighting bar member for indicating a fuse setting on the chart as set forth.

22. In a sighting apparatus for use with anti-aircraft guns the combination of a base, a sighting bar member representing the true line of sight, a second sighting bar member representing the future line of sight, both members being pivotally supported at one end on the base the points of support being adjacent, two horizontal and parallel members adjustably mounted above the base and each constituting a support for one of the sighting-bar members at a point intermediate in its length, means for moving the first sighting bar member on its horizontal supporting member at a substantially constant speed, means for simultaneously moving the second sighting bar member along its horizontal supporting member at a speed which is either the same as or different from that imparted to the first sighting bar member, a sighting device mounted on the first bar member, two graduated quadrants co-operating with the second bar member the quadrants being respectively disposed so as to give readings with the sighting bar member in a vertical plane and in a plane coincident with the horizontal member which supports the second sighting bar, a horizontal height fuse indicator chart carried on the base, and means actuated by the second sighting bar member for indicating a fuse setting on the chart as set forth.

23. In a sighting apparatus for use with anti-aircraft guns the combination of a support, a rectangular horizontal base pivotally carried on the support so that the base can be swung in azimuth, two sighting bar members each pivotally supported on the base at adjacent points which are substantially coincident with the pivot centre about which the base can swing, two vertical members disposed at opposite ends of the base, two horizontal and parallel tubular members carried towards their ends at the upper ends of the vertical members between which the horizontal members extend each tube having a longitudinal slot in it, a screw-threaded rod rotatably mounted in each tube, means for rotating the two screw-threaded rods simultaneously at the same or at different speeds, carrier members mounted so that they can slide respectively along the tubular members each carrier being adapted to engage and support one of the sighting bar members at a point intermediate in its length, means whereby each carrier can be caused to engage or to be disconnected from the screw-threaded rod within the tubular member on which the carrier slides so that the carriers can be moved separately and freely along their respective horizontal members and can also be moved in accordance with the rotation imparted to the screw-threaded rods, means for simultaneously moving the vertical members along the ends of the base, means for varying the height of the horizontal members above the base by simultaneously adjusting the height of the vertical members, a plate mounted on the base so that it can swing about a centre coincident with the pivot centre of the base, a height fuse indicator chart carried on the base, and means actuated by one of the sighting bar members for indicating a fuse setting on the chart as set forth.

24. In a sighting apparatus for use with anti-aircraft guns the combination of a base, a sighting bar member representing the true line of sight, a second sighting bar member representing the future line of sight, both members being pivotally supported at one end on the base the points of support being adjacent, two horizontal and parallel tubular members adjustably mounted above the base each tube having a longitudinal slot in it, a screw-threaded rod rotatably mounted in each tubular member, carrier members mounted so that they can slide respectively along the tubular members each carrier being adapted to engage and support one of the sighting bar members at a point intermediate in its length, means whereby each carrier can be caused to engage or to be disconnected from the screw-threaded rod within the tubular member on which the carrier slides so that the carriers can be moved separately and freely along their respective horizontal members and can also be moved in accordance with the rotation imparted to the screw-threaded rods, adjustable gearing through which the screw-threaded rods can be rotated simultaneously at the same or at different speeds whereby the first sighting bar will be moved along its horizontal supporting member at a substantially constant speed while the second sighting bar member will be simultaneously moved along its horizontal supporting member at a speed which is either the same as or different from that imparted to the first sighting bar member, a horizontal height fuse indicator chart carried on the base, and means actuated by one of the sighting bar members for indicating a fuse setting on the chart as set forth.

25. In a sighting apparatus for use with anti-aircraft guns the combination of a support, a rectangular horizontal base pivotally carried on the support so that the base can be swung in azimuth, a sighting bar member representing the true line of sight, a second sighting bar member representing the future line of sight, both members being pivotally supported at one end on the base the points of support being adjacent and substantially coincident with the pivot centre about which the base can swing, two vertical members disposed at opposite ends of the base and carrying at their upper ends two horizontal and parallel tubular members which extend between the vertical members each tubular member having a longitudinal slot in it, means for simultaneously moving the vertical members along the ends of the base, means for varying the height of the horizontal members above the base by simultaneously adjusting the height of the vertical members, a screw-threaded rod rotatably mounted in each tubular member, carrier members mounted so that they can slide respectively along the tubular members each carrier being adapted to engage and support one of the sighting bar members at a point intermediate in its length, means whereby each carrier can be caused to engage or to be disconnected from the screw-threaded rod within the tubular member on which the carrier slides so that the carriers can be moved separately and freely along their respective horizontal members and can also be moved in accordance with the rotation imparted to the screw-threaded rods, adjustable gearing through which the screw-threaded rods can be rotated simultaneously at the same or at different speeds whereby the first sighting bar member will be moved along its horizontal supporting member at a substantially constant speed while the second sighting bar member will be moved along its horizontal supporting member at a speed which is either the same as or different from that imparted to the first sighting bar member, a plate mounted on the base so that it can swing about a centre coincident with the pivot centre of the base, a height fuse indicator chart carried on this plate, and means actuated by one of the sighting bar members for indicating a fuse setting on the chart as set forth.

26. In a sighting apparatus for use with anti-aircraft guns the combination of a support, a rectangular horizontal base pivotally carried on the support so that the base can be swung in azimuth, a sighting bar member representing the true line of sight, a second sighting bar member representing the future line of sight, both members being pivotally supported at one end on the base the points of support being adjacent and substantially coincident with the pivot centre about which the base can swing, two vertical members disposed at opposite ends of the base and carrying at their upper ends two horizontal and parallel tubular members which extend between the vertical members each tubular member having a longitudinal slot in it, means for simultaneously moving the vertical members along the ends of the base, means for varying the height of the horizontal members above the base by simultaneously adjusting the height of the vertical members, carrier members mounted so that they can slide respectively along the tubular members each carrier being adapted to engage and support one of the sighting bar members at a point intermediate in its length, means whereby each carrier can be caused to engage or to be disconnected from the screw-threaded rod within the tubular member on which the carrier slides so that the carriers can be moved separately and freely along their respective horizontal members and can also be moved in accordance with the rotation imparted to the screw-threaded rods, adjustable gearing through which the screw-threaded rods can be rotated simultaneously at the same or at different speeds whereby the first sighting bar will be moved along its horizontal supporting member at a substantially constant speed while the second sighting bar will be moved along its horizontal supporting member at a speed which is either the same as or different from that imparted to the first sighting bar member, a sighting device mounted on the first bar member, two graduated quadrants co-operating with the second bar member the quadrants being respectively disposed so as to give readings with the sighting bar member in a vertical plane and in a plane coincident with the horizontal member on which the second sighting bar member is supported, a plate mounted on the base so that it can swing about a centre coincident with the pivot centre of the base, a height fuse indicator chart carried on this plate, and means actuated by the second sighting bar member for indicating a fuse setting on the chart as set forth.

In testimony whereof I have signed my name to this specification.

THOMAS CHARLES SINCLAIR.